Oct. 20, 1953           F. L. SYMONDS           2,656,258

REACTION FURNACE FOR CONTACTING A GAS AND FLUIDIZED SOLIDS

Original Filed April 18, 1945           3 Sheets-Sheet 1

Inventor:—
Fred L. Symonds
By Vandeveer Voorhees
Attorney

Oct. 20, 1953      F. L. SYMONDS      2,656,258
REACTION FURNACE FOR CONTACTING A GAS AND FLUIDIZED SOLIDS
Original Filed April 18, 1945      3 Sheets-Sheet 2

Inventor:-
Fred L. Symonds
By Vanderveer Voorhees
Attorney

Patented Oct. 20, 1953

2,656,258

UNITED STATES PATENT OFFICE 2,656,258

REACTION FURNACE FOR CONTACTING A GAS AND FLUIDIZED SOLIDS

Fred L. Symonds, Louisiana, Mo., assignor to Standard Oil Company, Chicago, Ill., a corporation of Indiana Original application April 18, 1945, Serial No. 588,987, now Patent No. 2,490,986, dated December 13, 1949. Divided and this application September 20, 1949, Serial No. 116,673

4 Claims. (Cl. 23—288)

This invention relates to an apparatus for conducting chemical reactions in the gas phase in the presence of finely divided, fluidized solids. The solids may act as catalysts to accelerate a chemical reaction involving one or more gases or vapors, or the solids may take part in the reaction by supplying certain chemical substances thereto, or by abstracting chemical substances therefrom. The invention relates also to gas phase reactions conducted at pressures approximating atmospheric pressure, and still more particularly to a process in which powdered solids are contacted with gases in two or more stages in series.

This application is a division of my application Serial No. 588,987, filed April 18, 1945, entitled Process of Producing Oxygen and now issued as U. S. Patent 2,490,986.

One object of the invention is to provide an apparatus for conducting gas phase chemical reactions in stages wherein large volumes of fluidized solids are maintained at elevated temperature in suspension in the gases undergoing reaction. Other objects of the invention include the following: to provide an apparatus for transferring large volumes of fluidized solids thru a series of separate reaction stages in a multistage process with a minimum expenditure of energy, minimum cost, and substantially no pressure differential between the stages; to provide an apparatus for uniformly contacting gases with fluidized solids at relatively low gas velocity and low pressure differentials between incoming and outgoing gases; to provide an apparatus for contacting gases with fluidized solids wherein the temperature of the contacting mass is controlled by radiation; and to provide a process of separating oxygen from air by contacting with fluidized solids in a low pressure system and to provide a furnace for conducting gaseous reactions in the presence of fluidized solids at high temperature in which the fluidized solid is retained as a relatively shallow layer, thus avoiding destruction of the apparatus by the movement of deep masses of fluidized solids.

Figure 1:
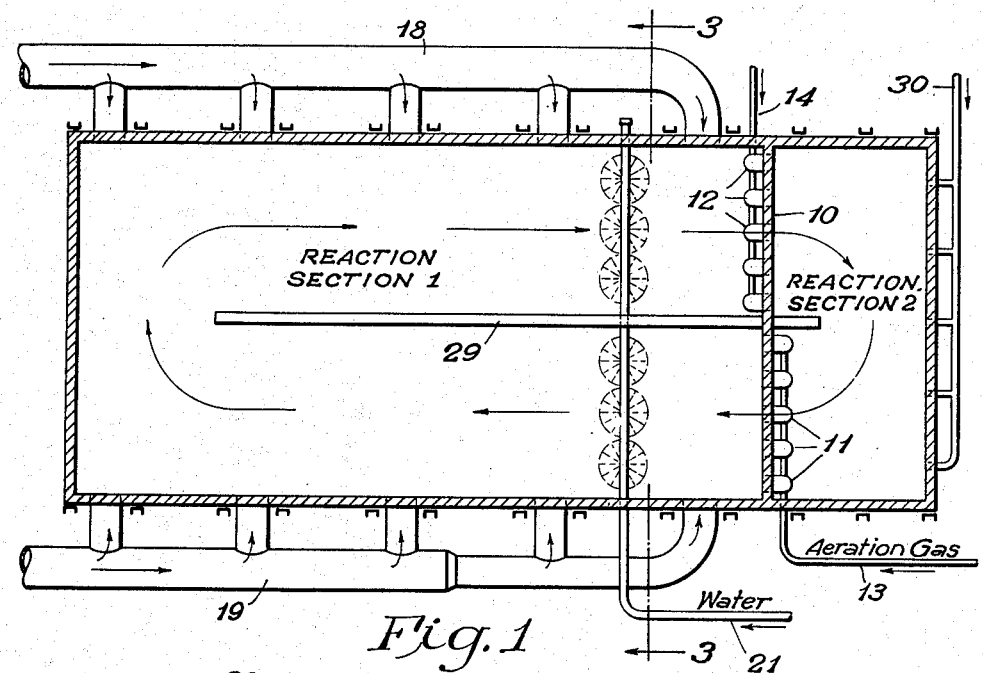
Figure 1 is a plan view of the contacting apparatus.

Referring to Figure 1, showing the rectangular form of furnace, two reaction sections are provided, No. 1 and No. 2, with a dividing wall 10 in between. The wall is provided with transfer lifts 11 and 12 for powdered solids. Aeration gas, for example steam, nitrogen, etc., is supplied to the lifts by pipes 13 and 14.

Figure 3:
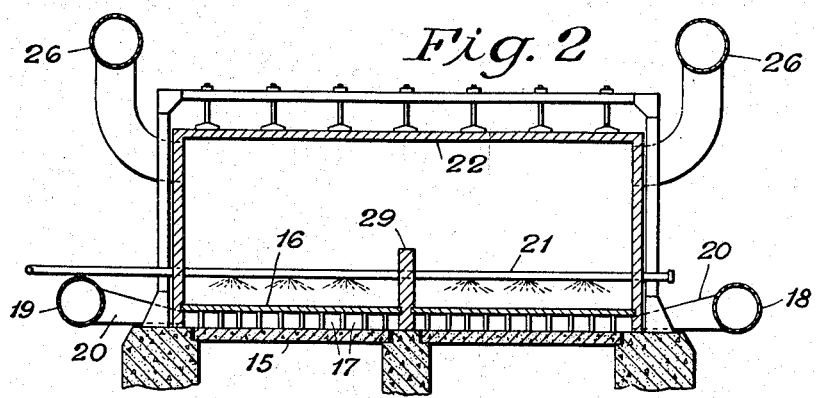
Figure 3 is a sectional view of the apparatus showing construction details.

Referring to Figure 3, the construction of the furnace floor is shown in some detail. Above a concrete slab 15 there is supported a false floor 16 or hearth constructed of open joint tile, brick, or preferably porous plate, fritted porcelain or silica ware, refractory at the temperatures employed in the furnace but sufficiently porous to permit the upflow of gases therethrough. Beneath the floor 16 are gas ducts 17 to which are connected reaction gas induction lines 18 and 19 by tuyères 20. Cooling may be supplied to the furnace by injection of water thru a plurality of water lines 21 extending into the furnace. These may effect cooling by indirect conduction of heat as in the case of a water coil heat exchanger. Where a large amount of cooling is needed the water lines 21 may be perforated to supply a water spray to the furnace. It is preferred to construct the furnace with horizontal roof 22 to provide a uniform distribution of radiant heat from the roof of the furnace downward against the fluidized solids moving across the furnace floor. Radiation between the bed of solids and the roof may be in either direction from hearth to roof or vice versa, depending on whether the solids are being heated or cooled. The roof may be cooled by a water spray within the reaction chamber or by other means where cooling is desired, or it may be heated by a flame or by other means when it is desired to radiantly heat the solids in the bed on hearth 16. It is preferred that the roof be substantially co-extensive with the hearth and it is important that the distance between the roof and the hearth be relatively short, depending upon the size of the furnace. The distance should not be greater than one-half the square root of the internal area of the roof and it is preferred that it be from one-quarter to one-tenth the square root of the internal roof area. The walls and roof of the furnace are constructed of suitable refractory material such as firebrick, magnesite brick, asbestos, etc.

Figure 4:
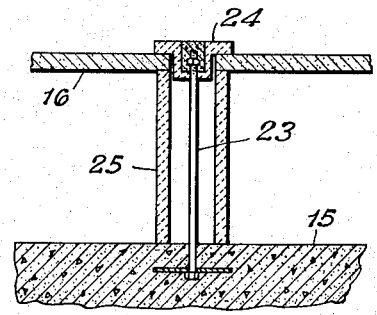
Figure 4 shows the floor construction detail.

The porous floor construction is shown in greater detail in Figure 4 which illustrates a suitable arrangement for attaching and holding in place the porous tiles or plates 16. In this construction, bolt 23 imbedded in concrete base 15 serves to hold the porcelain washer 24 down on the tiles 16. Porcelain or tile support 25 is suitably made in the form of a cylinder on which the corners of four adjoining tiles are rested.

Figure 2:
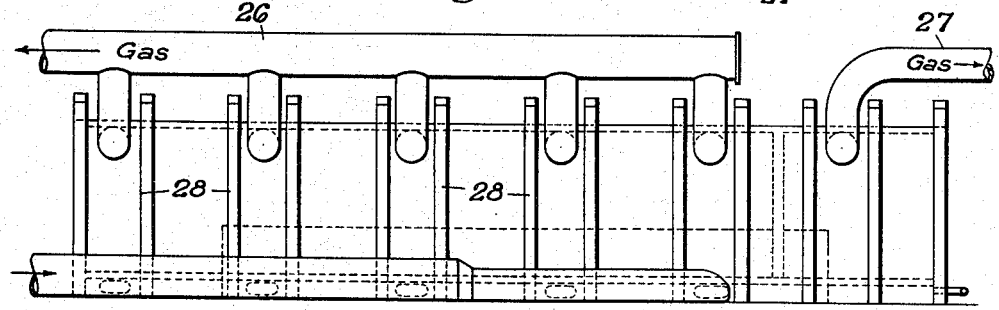
Figure 2 is an elevational view of the same apparatus.

Connections for withdrawing gases from the furnace are indicated by headers 26 and 27 in Figure 2. In this figure, the header 26 is the gas outlet from reaction section 1 while 27 conducts the gas away from reaction section 2. Wall and roof supports are indicated at 28.

Referring again to Figure 1, the fluidized solids maintained in turbulent motion by gases flowing upwardly therethrough from the porous floor of the furnace form a shallow pool, the depth of which is usually maintained at about 2 to 4 feet, more or less, depending on the reaction employed. As rapidly as solids are transferred thru the dividing wall between the reaction zones No. 1 and No. 2 in one direction, an equal amount of solids are transferred in the reverse direction following the arrows. The center baffle plate 29 serves to direct the flow of solids in a generally elliptical path to avoid short circuiting between the transfer lifts 11 and 12. It should be understood that the wall 10 may be in any suitable position dividing the furnace into sections of equal size or unequal size as indicated, where the difference in reaction velocities requires a longer time of contact in one reaction zone than in the other. Reaction gas or vapor is supplied to reaction section 2 by line 30 with connections leading to the subfloor ducts beneath this section. For most operations, the level of the fluidized solids pool on each size of the wall 10 is about the same with the same pressure, usually atmospheric, in each section of the furnace.

Figure 5:
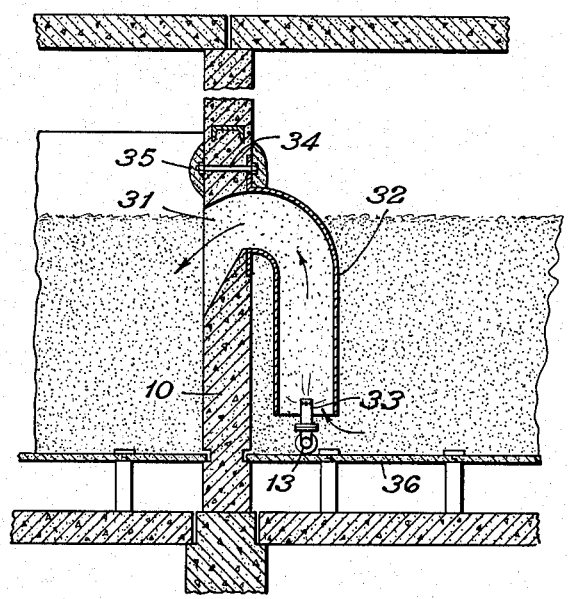
Figure 5 is a sectional detail showing one form of wall construction with provision for fluidized solids transfer between stages.

A detail showing the construction of a suitable transfer lift 11 is shown in Figure 5 wherein the dividing wall 10 may be of reinforced concrete construction, provided with a port 31 to which is connected lift tube 32. Tube 32 is of suitable refractory material such as porcelain or ceramic ware, or it may be of metal resistant to heat and corrosion, for example Chromel, calite or duriron. Aeration gas from supply line 13 is introduced thru a suitable nozzle 33 into the dependent open end of transfer lift 32. Bolts 34 employed in attaching the transfer lift to the dividing wall may be protected from heat and corrosion by asbestos cement covers 35.

It should be understood that the body of the furnace is preferably constructed of steel plates with gas-tight joints with provision for expansion and contraction of the refractory lining therein. The gas phase zones of the separate reaction sections are completely separated and gas is effectively prevented from passing from zone to zone by the fluidized solids transfer lifts 32 which extend nearly to the floor of each section and the openings 31 in dividing wall 10 are thereby sealed by the pools of fluidized solids in their respective zones. Aeration supplied to the fluidized solids in lifts 32 reduces the density locally within the lift causing the solids to rise and flow over thru the opening 31. By directing the stream of solids horizontally or downwardly as indicated, there is a minimum of dispersion of the solids in the gas phase space of the section to which they are transferred. As indicated in Figure 5, the floor tiles 36 directly below the openings into the transfer lifts 32 may, if desired, be impervious to gases to prevent gases charged to the reaction zone from rising into the transfer lifts with the solids. The only gases transferred with the solids are therefore the aeration gas supplied thru nozzles 33 and the gas occluded in the solids from the reaction section.

If it is desired to remove occluded gases from the powdered solids passing from section to section, this may be accomplished by supplying solids to lifts 11 and 12 by short downcomers into which the solids are subjected to inert stripping gas, for example steam. However, it is generally not necessary to resort to this expedient.

Figure 6:
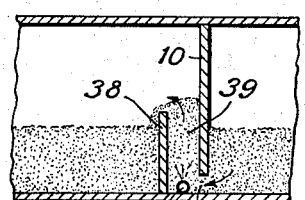
Figure 6 is a section of a modified separator wall construction providing for transfer of fluidized solids.

In Figure 6 is shown a simplified lift arrangement in which the dividing wall 10 between sections is provided with an opening or series of ports 37 at the bottom, and opposite the ports a weir 38 over which the fluidized solids are lifted by aeration gas injected thru line 13. Aeration line 13 may be a horizontal pipe line in the bottom of the lift space 39 included between the wall 10 and baffle 38 and aeration gas may be injected thru suitable nozzles fitted in line 13.

Figure 8:
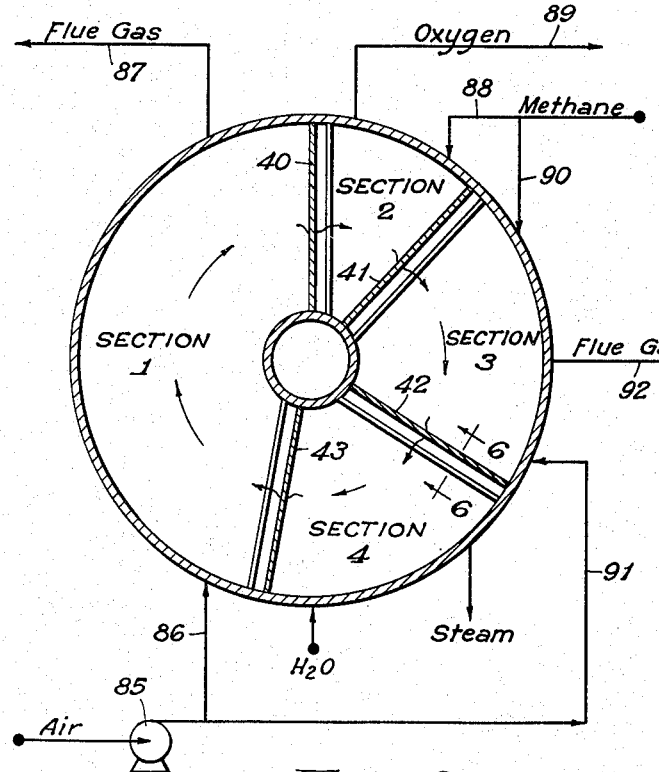
Figure 8 is a plan view of an alternative furnace construction.

An alternative arrangement of furnace is shown in Figure 8 in which the plan of the furnace is circular instead of rectangular and the fluidized solids pursue a circular course from section to section. Four sections are illustrated as indicated on the drawing, the fluidized solids flowing under dividing walls 40, 41, 42 and 43 as indicated by the arrows. Just as in the case of the rectangular furnace shown in Figure 1, the reacting gases are injected thru the porous floor of each section and withdrawn from a higher point therein. The application of the furnace shown in Figure 8 to a process of abstracting oxygen from air will be described hereinafter.

There are many applications of my improved fluidized solid contacting furnace to industrial processes including such processes as the conversion of hydrocarbons, the cracking of hydrocarbon oils, the purification of gases, reduction of fluidized ores, manufacture of water gas, the prepartion of synthesis gas for the Fischer process by conversion of methane with metal oxides into carbon monoxide and hydrogen, etc. Following is a description of the application of this apparatus to the recovery of oxygen from air.

The process is especially applicable to making oxygen, particularly to the manufacture of industrial oxygen where high purity is not required and where the oxygen concentration in the product gas may vary from about 75 to 95 per cent. The use of my fluid flow furnace offers a method for making industrial oxygen more cheaply than has been possible heretofore. Thru the agency of a metal oxide, or other agent existing in two states of oxidation capable of acting as an oxygen carrier between two stages at different temperatures, a regeneration stage and a decomposition stage, it is possible to operate an oxygen process with my furnace in a continuous uninterrupted manner with accurate control of temperature and without the necessity of indirectly applying heat to either the oxide regeneration stage or the oxide decomposition stage.

Previous chemical processes for the manufacture of oxygen, such as the Brin process employing barium oxides and the du Motay process employing manganites, have been unable to compete with the liquid air process because of several inherent difficulties, one important difficulty being the intermittent operation with lack of proper temperature control and heat balance between the various stages of the process. I have now discovered that these difficulties encountered with the oxide process can be overcome when employing the oxide in the form of a fluidized turbulent mass in the furnace hereinabove described and continuously recycling the dense fluidized mass as a pseudo liquid stream between two stages of oxidation. By this means I have found it possible to control the operation with far greater accuracy than has heretofore been possible, and as a result the state of oxidation of the metal oxide is more uniformly regulated, giving greater production of oxygen. I have also found that the decomposing stage, or lower stage of oxidation, can be maintained at a higher temperature by the simple expedient of introducing a controlled amount of a combustible gas therein.

Figure 7:
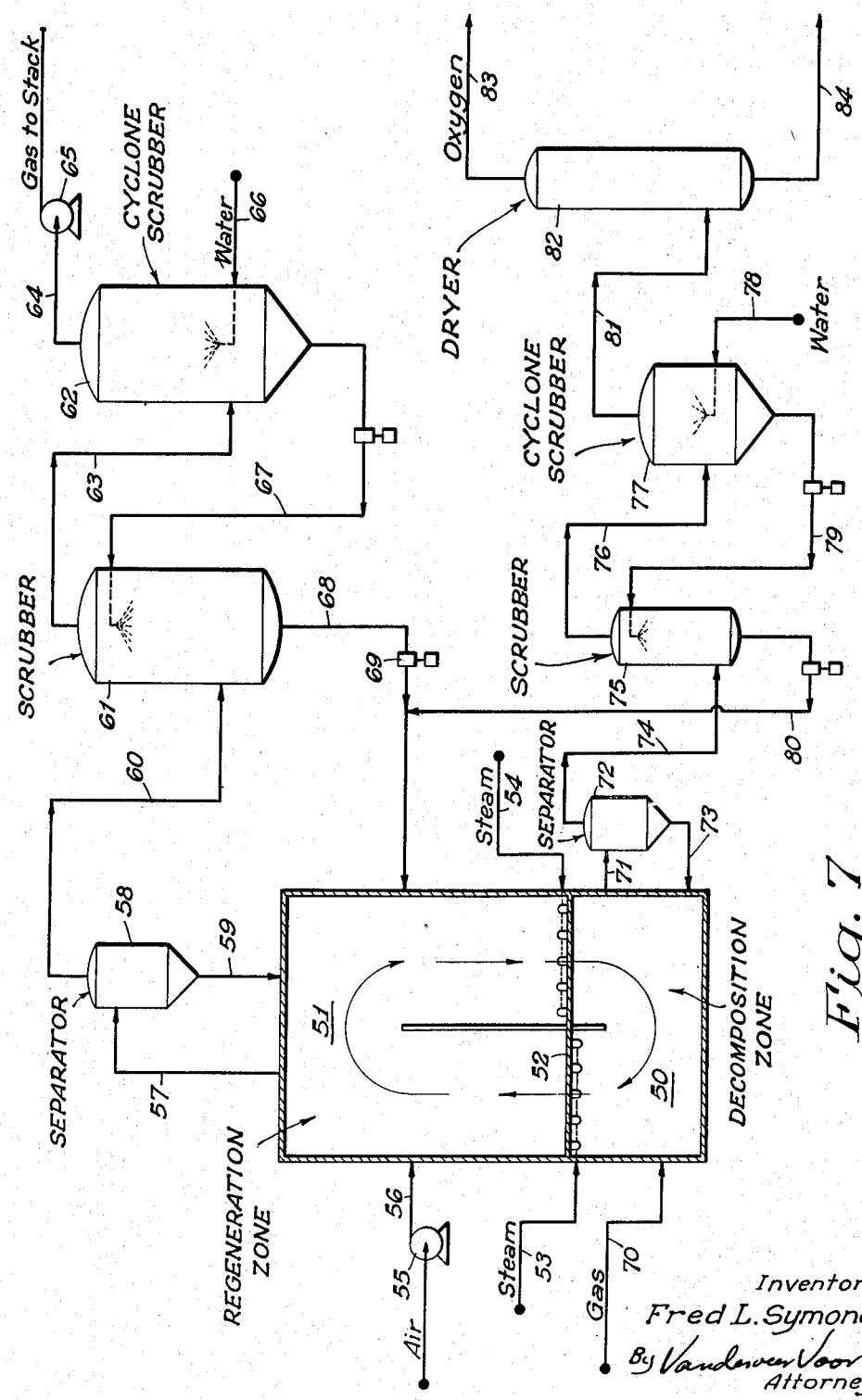
Figure 7 is a flow diagram illustrating the use of the furnace, shown in plan, in a process of separating oxygen from air, with accessories shown in schematic elevation.

Application of the improved contacting method to oxygen manufacture is illustrated in Figure 7 which shows schematically in plan section, a rectangular furnace similar to that shown in Figure 1 to which is connected accessory apparatus shown in elevation for handling the gaseous products from the furnace. Referring to the drawing, 50 is the decomposing section of the furnace and 51 the regeneration section, fluidized solids being circulated between the two sections thru dividing wall 52 as indicated by the arrows. Steam for the transfer lifts is provided by lines 53 and 54. Regeneration air is supplied to section 51 by blower 55 and conduit 56, leading the air beneath the porous floor of the regeneration section. Spent regeneration gas consisting largely of nitrogen and some unused oxygen is conducted by line 57 to cyclone separator 58 wherein most of the entrained powdered solid oxygen carrier is recovered and returned to the regenerator by line 59.

The remaining nitrogenous gas from separator 58 is conducted by line 60 to water scrubber 61 where remaining oxygen carrier is recovered from the gases. A second scrubbing stage is shown at 62, the gases being conducted from 61 to 62 by line 63. The spent gases are withdrawn by line 64 and exhauster 65. Water supplied by line 66 to scrubber 62 is conducted with any solids accumulated therein to the first scrubbing stage 61, transfer line 67 being provided for the purpose. The slurry of recovered solids and water is returned to the regeneration zone of the oxygen furnace by line 68 and pump 69. In the regeneration zone 51, the slurry is evaporated by the excess heat therein and simultaneously serves the useful purpose of reducing the temperature in the regeneration stage.

Regenerated oxygen carrier from 51 is heated to a higher temperature in section 50 by any suitable means but preferably by the injection of combustible gas thru line 70 leading to the subfloor space below section 50, the gas being evenly distributed throughout the mass of flowing, turbulent fluidized solid oxygen carried by the porous gas-permeable floor hereinbefore described. The amount of gas supplied is just sufficient to consume a portion of the oxygen of the heat carrier and provide as a result of the combustion the amount of heat necessary to raise the temperature of the decomposition zone to the desired decomposition point. In a typical operation, the decomposition temperature may be about 500 to 600° C. and preferably about 550° C. Simultaneously the regeneration temperature may be about 300 to 450° C., preferably about 400° C.

Oxygen liberated by the increased temperature of the decomposition zone 50 is withdrawn from the vapor space thereof by line 71 leading to cyclone separator 72 wherein entrained solids are removed and returned by line 73 to the decomposition section. The oxygen admixed with combustion products from the heating gas supplied by line 70 is conducted by line 74 to scrubber 75, thence by line 76 to the second scrubbing stage 77. Solids separated in the scrubbers are conveyed by water which is introduced thru line 78 to scrubber 77 thence by line 79 to scrubber 75 and thence by line 80 back to regeneration zone 51 wherein the water is evaporated and the solids are returned to the furnace.

Steam resulting from the combustion in section 50 is largely condensed in the scrubbers 75 and 77 and the remaining oxygen is led by line 81 to condenser tower 82 where it is further cooled, preferably by refrigerator coils, to remove the remaining water and provide substantially dry oxygen to the outlet 83, condensed water being discharged by line 84.

Where the heating gas supplied by line 70 is a hydrocarbon gas or one containing carbon compounds, e. g. water gas, the oxygen produced will contain from 5 to 25 per cent of $CO_2$. This may be removed by any suitable $CO_2$-absorbing system such as the alkali carbonate system, triethanolamine, or other suitable process. For some purposes the oxygen may be employed without removal of $CO_2$, for example in the smelting of ores, refining of steel, and in the Fischer process for preparing synthesis gas. In the latter reaction, the oxygen is used to maintain the temperature of the gas maker in the water gas temperature range, e. g. 1700 to 2200° F., and any $CO_2$ contained in the oxygen is converted to CO by the fuel employed be it coke, methane, or other suitable carbonaceous material.

Where a supply of hydrogen is available it may be employed as the heating gas in zone 50 thereby producing only water on combustion in the decomposition zone, making it unnecessary to supply a carbon dioxide removal step in the process. A suitable source of hydrogen for the purpose is an adjacent electrolytic hydrogen-oxygen plant. The oxygen produced in the electrolytic plant may be combined with the oxygen produced in the chemical process just described. Regardless of what heating gas is used, it is preferred to use a gas substantially free of nitrogen so that the oxygen produced in the process will not be contaminated with excessive amounts of nitrogen. Natural gas, refinery gas, water gas or the tail gas from a synthol process may be employed. The gas may be preheated to a high temperature, e. g. 500 to 1000° F., before introducing it into the decomposer, heat for the purpose being obtained largely by heat exchange with hot products withdrawn from the regenerator and/or the decomposer.

In the decomposer 50, the oxygen carrier liberates oxygen at the higher temperature prevailing therein and the liberation of oxygen is assisted by dilution with steam or other gases, particularly the decomposition products, steam and $CO_2$, resulting from the combustion of the heating gas introduced by line 70.

In a typical operation of my process, I may maintain the temperature of the regenerator at about 400° C., employing for the oxygen carrier calcium manganite preferably deposited on a suitable carrier such as silica gel, clay, bauxite, diatomaceous earth, aluminum oxide, magnesia or an acid-treated clay such as Super Filtrol. The regenerated or reoxidized carrier is then conducted to the decomposer where it is heated to about 600° C. as hereinabove described, at which temperature oxygen is liberated and the calcium manganite is reduced to a lower state of oxidation, in which form it is recycled to the regenerator 12 wherein its temperature is again reduced to about 400° C., by water evaporation and cold regeneration air in which condition it is capable of absorbing additional oxygen from the air introduced by blower 55. The temperature of the hot oxygen carrier flowing from 50 to 51 may also be reduced by passing it over indirect heat exchanger coils in the regenerator and the heat obtained in this way may be employed for regenerating steam or for other purposes.

Another oxygen carrier which may be used in the process is calcium plumbate, preferably in admixture with manganese oxide and supported on a suitable, finely divided solid. Manganese oxides promoted with copper oxides may be employed at temperatures of 1000 to 1200° C. for the regeneration and disengaging stages, respectively. Catalysts may also be used. Certain other oxygen carriers may be employed, particularly the alkali metal manganites and plumbites, and barium oxide, if the operation is conducted with exclusion of $CO_2$ from the decomposer and regenerator. In order to operate satisfactorily with these oxygen carriers, it is necessary to carefully scrub the air employed in the regenerator to remove $CO_2$, and it is not possible to employ carbonaceous gas for internally heating the decomposer. In that case, if hydrogen free of carbon compounds is not available for the purpose, it is necessary to supply heat to the decomposer indirectly. This can be accomplished by circulating the fluidized solids in the decomposer thru a tubular furnace, not shown, indirectly heated to obtain the desired temperature.

In the operation of the furnace, the fluidized solids oxygen carrier may suitably have a density of about 50 pounds per cubic foot when aerated in the furnace by an upflow gas stream moving with a vertical velocity of about four feet per second. In the transfer lifts from wall 52, the density of the fluidized solids oxygen carrier may suitably be reduced to about 20 to 30 pounds per cubic foot by additional aeration as indicated. Pressure in the furnace is suitably about 1 to 5 p. s. i. gage in each section.

The oxygen carrier, suitably calcium manganite in the form of a powder, may have a particle size corresponding to 20 mesh and finer, i. e. 50 to 200 mesh. Still finer material may be employed of the order of 300 to 400 mesh but if too fine, provision must be made for recovering the oxygen carrier from the gases in addition to simple settling or cyclone separation. The density of the oxygen carrier suspension when in operation will vary greatly with the nature thereof but it will usually be about 25 to 100 pounds per cubic foot depending on the specific material employed, its particle size, and the air velocity employed in the regenerator. The fluidized suspension forms within the regenerator a pseudo liquid layer, the depth of which is preferably maintained at about 3 to 5 feet. Inasmuch as the regenerator normally must be cooled, this may be accomplished by injecting regulated amounts of water by line 21 (Figures 1 and 3), the resulting steam passing off with the nitrogen thru line 26. In order to avoid dilution of the air in the fluidized solids in the regenerator with the steam thus produced, I can inject the water into the gas space in the regenerator, thus cooling the bed of solids indirectly by radiation as indicated hereinabove. The steam resulting from the vaporization of cooling water together with the residual nitrogen of the air charged to the regenerator is conducted from the regenerator by line 26 leading to a stack for producing natural draft to assist in operation of the regenerator.

Referring again to Figure 8 previously discussed, the circular furnace shown in sectional plan view is provided with four sections instead of two as in the case of the furnace described in Figure 1. In section No. 1, the regenerating zone, the oxygen carrier is oxidized to a higher state of oxidation by air injected below the porous floor of the furnace, air being supplied by blower 85 thru duct 86 and denuded air consisting largely of nitrogen and about 2 to 10 per cent of oxygen is discharged to the flue by line 87 connected to the gas space in section No. 1.

From section No. 1 the fluidized solids flow thru dividing wall 40 into section No. 2 in which the temperature is raised by the introduction of a fuel gas, e. g. methane, by line 88 connecting to the subfloor space below the fluidized solids bed. At the higher temperature, e. g. 550° C., the oxygen is disengaged and discharged by line 89. Sufficient lime or other suitable oxide is employed with the oxygen carrier in fluidized finely divided form to absorb in section 2 carbon dioxide produced in the combustion of the heating gas, calcium carbonate being formed by the carbonation of the lime. The oxygen discharged thru line 89 is accordingly substantially free of carbon dioxide and for most processes will require no further decarbonation.

The fluidized solid oxygen carrier and calcium carbonate are now conducted to section No. 3 wherein the temperature is still further increased, e. g. to 500 to 1000° C., as a result of the combustion of additional fuel gas supplied by line 90 interacting with air supplied by line 91. At the higher temperature obtained in section No. 3, the lime is calcined, regenerating calcium oxide and discharging $CO_2$ to the flue by line 92. Combustion gas and air may be mixed in a suitable burner before injecting into the subfloor space in section No. 3, the heated combustion products passing upwardly thru the layer of fluidized solids and the flue gas being discarded from the gas space in section No. 3 by line 92.

The calcined mixture of oxygen carrier and lime is next cooled in section No. 4 by a water spray or by indirect cooling, the temperature being again returned to 300 or 400° C. before returning the oxygen carrier and lime thru dividing wall 43 into section No. 1 for recharging with oxygen.

Figure 9:
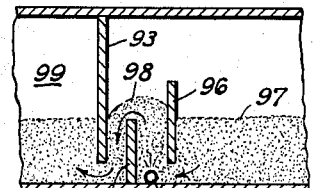
Figure 9 is a modified solids transfer lift.

The fluidized solids transfer lift zone in Figure 9 is a modification of that shown in Figure 6 previously described. Its operation differs in that the dividing wall 93 is located on the outflow side of the baffle 94, whereas in Figure 6 the dividing wall 10 is on the inlet side of the space defined between the wall 10 and baffle 38. Aeration gas supplied by perforated pipe 95 serves to reduce the density of the fluidized solids in the space between the baffle 94 and floating baffle 96, forming a chimney within which the fluidized solids rise to an elevation above the level of the fluidized bed 97. Aeration gas escapes from the solids at the surface 98 allowing the fluidized solids which spill over baffle 94 to flow by gravity under wall 93 into the adjacent chamber 99. With this form of transfer lift, there is less danger of escape of gas from the gas phase of one section to the gas phase of the adjacent section under dividing wall 93 for the reason that the fluidized solids bed level is higher at the dividing wall than the average level of the fluidized bed in the adjoining chambers.

As hereinabove indicated, oxygen made by my process is particularly advantageous for use in the Fischer process of hydrocarbon synthesis. Carbon dioxide which it contains as a result of the combustion reaction in the metal oxide decomposition stage can be reduced to carbon monoxide at water gas temperatures in the gas preparation step for Fischer synthesis. In carrying out this procedure, the oxygen from the decomposition zone containing from 10 to 50 per cent of $CO_2$ and a small amount of nitrogen, e. g. 5 to 15 per cent, is conducted preferably while hot to the gas preparation reaction chamber which is suitably maintained at a temperature of about 800 to 1100° C. Additional fuel is supplied to the gas preparation chamber and for this purpose solid liquid or gaseous fuels may be employed, such as coke, residual oils, fuel oils, natural gas, etc. It is preferred to employ hydrocarbon gases, particularly methane. In the preparation step, the methane is converted to carbon monoxide and hydrogen by the action of the oxidizing gas from the oxygen generator. Part of the hydrogen serves to reduce the carbon dioxide to carbon monoxide, an endothermic reaction absorbing part of the heat generated by the action of the oxygen on the methane, thus serving to balance the reaction thermally. The temperature is controlled by regulating the proportion of methane to oxygen employed in the gas preparation converter. Additional control may be obtained by segregating a portion of the oxygen-$CO_2$ product from the oxygen generator, extracting $CO_2$ from it, e. g. by solution in water under pressure or by selective solvents such as triethanolamine, sodium carbonate, etc., and then charging it to the gas preparation reactor, preferably after reheating in a suitable heat exchanger. Superheated steam may also be supplied to the gas preparation reactor to assist in controlling the composition of the products, particularly the ratio of hydrogen to carbon monoxide produced. For some reactions it is desirable to make a synthesis gas having a ratio of hydrogen to carbon monoxide of 2:1 whereas in other operations lower hydrogen ratios are desirable, e. g. 1.5:1. A higher ratio of hydrogen to carbon monoxide is usually desirable where the gas is employed in the synthesis of methanol. Where the gas is desired for the methanol synthesis rather than hydrocarbon synthesis as in the Fischer process, the gas preparation converter may be operated under conditions to allow carbon dioxide to remain unreduced in the product gases and the carbon dioxide can be converted to methanol in the methanol synthesis step.

Although I have described the application of my invention to certain specific processes, it should be understood that this is by way of illustration and is not a limitation of the scope of the invention. In addition to the application of the invention to the process of oxygen recovery, it may also be applied to conversion of hydrocarbon gases, cracking of hydrocarbon oils, purification of gases, for example desulfurization and decarbonation, and in general any process in which a gas is contacted with a fluidized solid contact agent, catalyst or chemical reagent. In my co-pending application, Serial No. 613,792, filed August 31, 1945, entitled Natural Gas Conversion to Hydrogen and Carbon Monoxide, and issued as U. S. Patent 2,631,094, I have shown a method of making feed gas for the Fischer process, using fluidized solids as oxygen carriers. The scope of the invention is described by the following claims.

I claim:

1. An apparatus for contacting finely divided solids and gases, said apparatus comprising a furnace chamber, a gas permeable hearth within said chamber, a gas-induction space beneath said hearth, a refractory roof within said chamber over said hearth, a gas-contacting space above said hearth and below said roof within said chamber, an upstanding wall means extending between said roof and said hearth dividing said furnace chamber into at least two furnace sections above said hearth and at least two gas-induction spaces below said hearth, port means comprising at least one port in one portion of said wall means adapted to discharge flowing solids from a first one of said furnace sections into a second one of said furnace sections above said hearth and additional ports in another portion of said wall means adapted to discharge flowing solids from said second furnace section into said first furnace section, thereby providing series flow of solids through said sections, said port means in said wall portions comprising a plurality of inverted J tubes having the stems depending into the respective discharging section, separate duct means for supplying separate gas streams to said gas-induction spaces beneath said hearth, and separate conduit means for withdrawing gases separately from the said furnace sections above said hearth.

2. The apparatus of claim 1 wherein the refractory roof of said furnace chamber above said hearth is in radiant heat relation thereto and the distance between the roof and hearth is less than one-half the square root of the internal area of the roof.

3. The apparatus of claim 1 wherein the furnace chamber is rectangular in shape, the said wall divides the furnace chamber into a minor furnace section and a major furnace section, and said major section contains a baffle wall extending upward from said hearth and normal to said wall to divide said major section into a U-shaped channel.

4. The apparatus of claim 1 comprising a substantially cylindrical furnace chamber, and a dividing wall extending radially within said chamber.

FRED L. SYMONDS.

References Cited in the file of this patent

UNITED STATES PATENTS

| Number | Name | Date |
| --- | --- | --- |
| 2,371,619 | Hartley | Mar. 20, 1945 |
| 2,385,446 | Jewell et al. | Sept. 25, 1945 |
| 2,404,944 | Brassert | July 30, 1946 |
| 2,464,812 | Johnson | Mar. 22, 1949 |
| 2,468,508 | Munday | Apr. 26, 1949 |
| 2,477,042 | Burnside | July 26, 1949 |
| 2,477,751 | Johnson | Aug. 2, 1949 |
| 2,539,263 | Munday | Jan. 23, 1951 |